(12) United States Patent
Thomassin et al.

(10) Patent No.: US 8,696,312 B2
(45) Date of Patent: Apr. 15, 2014

(54) AXIAL LOAD DAMPING SYSTEM FOR ROTOR SHAFT

(75) Inventors: Jean Thomassin, Ste-Julie (CA);
Charles Faubert, Longueuil (CA);
André D. Leblanc, Saint-Bruno (CA)

(73) Assignee: Pratt & Whitney Canada Corp., Longueuil (CA)

( * ) Notice: Subject to any disclaimer, the term of this patent is extended or adjusted under 35 U.S.C. 154(b) by 1108 days.

(21) Appl. No.: 12/697,501

(22) Filed: Feb. 1, 2010

(65) Prior Publication Data

US 2011/0188995 A1    Aug. 4, 2011

(51) Int. Cl.
*F04D 29/10* (2006.01)

(52) U.S. Cl.
USPC .......................................... 415/230; 415/231

(58) Field of Classification Search
USPC .......................................... 415/229, 230, 231
See application file for complete search history.

(56) References Cited

U.S. PATENT DOCUMENTS

| | | |
|---|---|---|
| 3,844,630 A | 10/1974 | Lechner |
| 3,881,841 A * | 5/1975 | Straniti ................. 415/131 |
| 3,980,358 A | 9/1976 | Davis |
| 4,440,456 A | 4/1984 | Klusman |
| 4,509,804 A | 4/1985 | Klusman |
| 4,657,410 A | 4/1987 | Hibner |
| 4,669,893 A | 6/1987 | Chalaire et al. |
| 4,721,398 A | 1/1988 | Miyashita et al. |
| 4,838,028 A | 6/1989 | Witt |
| 5,020,923 A | 6/1991 | Heitz et al. |
| 5,071,262 A | 12/1991 | Monzel et al. |
| 5,344,239 A | 9/1994 | Stallone et al. |
| 5,548,170 A | 8/1996 | Shultz |
| 6,155,720 A | 12/2000 | Battig |
| 6,558,041 B2 | 5/2003 | Laos |

* cited by examiner

*Primary Examiner* — Dwayne J White
(74) *Attorney, Agent, or Firm* — Norton Rose Fulbright Canada LLP

(57) ABSTRACT

A damping system for a gas turbine engine comprises a bearing mounted to a rotor shaft and a support connected to an outer race of the bearing. The support has a wall secured to a casing of the gas turbine engine at a connection portion. The wall has a first surface positioned against a surface of the casing with the first surface being in a non-parallel relation with the rotational axis of the rotor shaft. A cavity is defined in the first surface by a narrowing of a thickness of the wall. The cavity contains a damping fluid to dampen elastic deformation of the wall at the cavity resulting from axial oscillations of the rotor shaft. An abutment is provided to limit an amplitude of the elastic deformation of the wall.

16 Claims, 2 Drawing Sheets

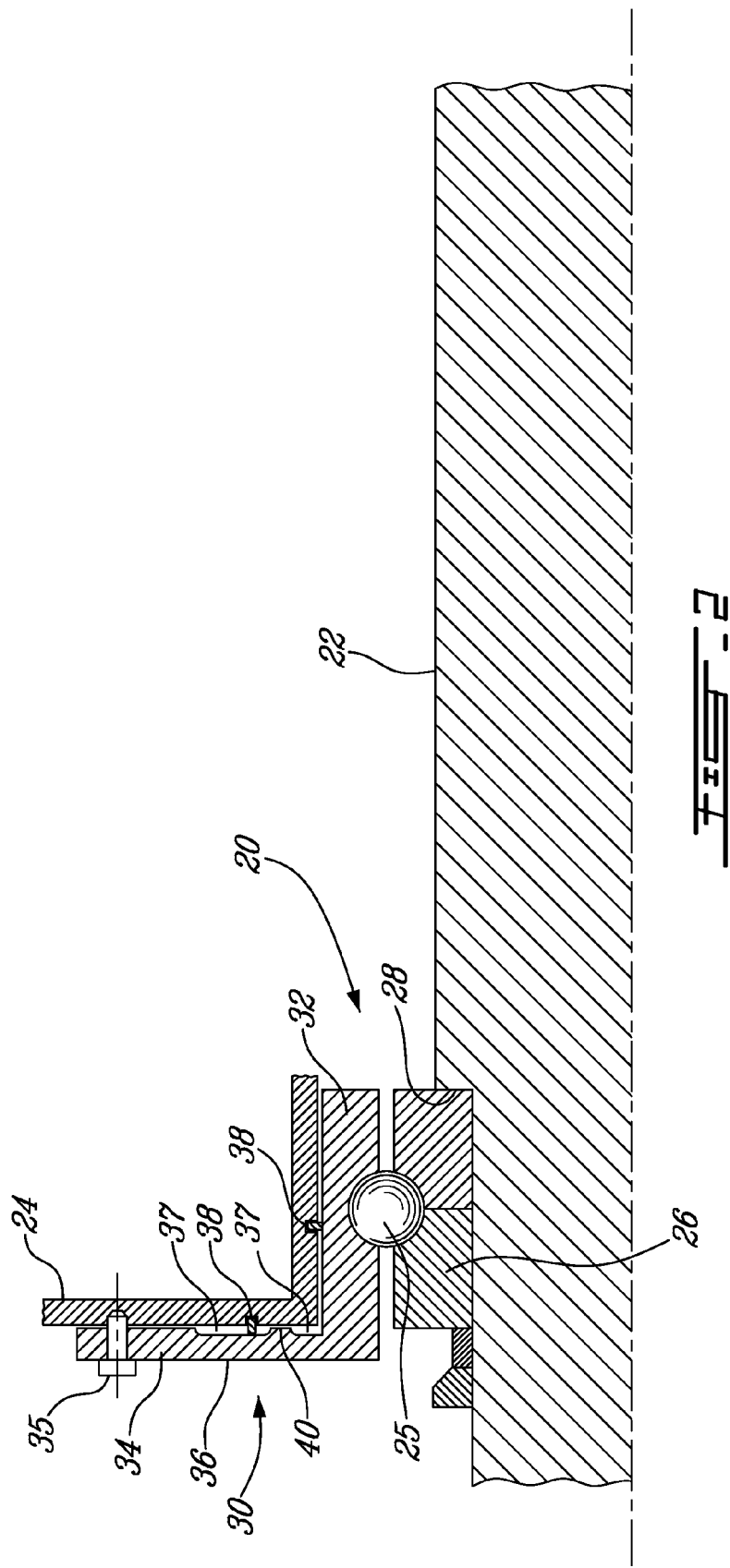

US 8,696,312 B2

AXIAL LOAD DAMPING SYSTEM FOR ROTOR SHAFT

TECHNICAL FIELD

The application relates generally to gas turbine engines and, more particularly, to the damping of axial oscillations of a compressor rotor spool.

BACKGROUND OF THE ART

Gas turbine compressor spools can oscillate axially in harmony with a pressure pulse generated in the gas path, with a relatively low frequency noise resulting (e.g. 100-400 Hz). The pressure pulse in the gas path may be caused by any of the combustion system, compressor blade row rotating stall, and mild surging of a compressor stage. The varying pressure causes fluctuations of the axial load on the turbine blades and disks of the compressor. Depending on the axial stiffness of the thrust bearing support connected to the casing of the gas turbine engine, the axial movement of the rotor spool can fall in phase with the source of the pressure pulse, potentially producing a relatively loud noise.

Accordingly, there is a need to provide an improved axial damping of rotor spool oscillations.

SUMMARY

In one aspect, there is provided a damping system for a gas turbine engine comprising: at least one bearing mounted to a rotor shaft; a support connected to an outer race of the bearing, the support comprising a wall secured to a casing of the gas turbine engine at a connection portion, the wall having a first surface positioned against a surface of the casing with the first surface being in a non-parallel relation with the rotational axis of the rotor shaft, a cavity defined in the first surface by a narrowing of a thickness of the wall, the cavity containing a damping fluid to dampen elastic deformation of the wall at the cavity resulting from axial oscillations of the rotor shaft, and an abutment in the first surface adjacent to the cavity and separated from the connection portion of the wall by the cavity to limit an amplitude of the elastic deformation of the wall by abutment with the casing; and at least one seal between the support/bearing and the casing to contain the damping fluid in the cavity.

In a second aspect, there is provided a gas turbine engine comprising: a casing; a compressor rotor spool including a rotor shaft; a damping system comprising at least one bearing mounted to the rotor shaft, a support connected to an outer race of the bearing, the support comprising a wall secured to the casing at a connection portion to support the bearing with respect to the casing for axial rotation of the rotor shaft, the wall having a first surface positioned against a surface of the casing with the first surface being in a non-parallel relation with the rotational axis of the rotor shaft, a cavity being defined in the first surface by a narrowing of a thickness of the wall, the cavity containing a damping fluid to dampen elastic deformation of the wall at the cavity resulting from axial oscillations of the rotor shaft, and an abutment adjacent to the cavity and separated from the connection portion of the wall by the cavity to limit an amplitude of the elastic deformation of the wall by abutment with the casing, and at least one seal between the support/bearing and the casing to contain the damping fluid in the cavity.

DESCRIPTION OF THE DRAWINGS

Reference is now made to the accompanying figures, in which:

FIG. 2 is a sectional view of an axial load damping system for a rotor shaft of the gas turbine engine of FIG. 1, in accordance with an embodiment of the present disclosure.

DETAILED DESCRIPTION OF THE PREFERRED EMBODIMENTS

Figure 1:
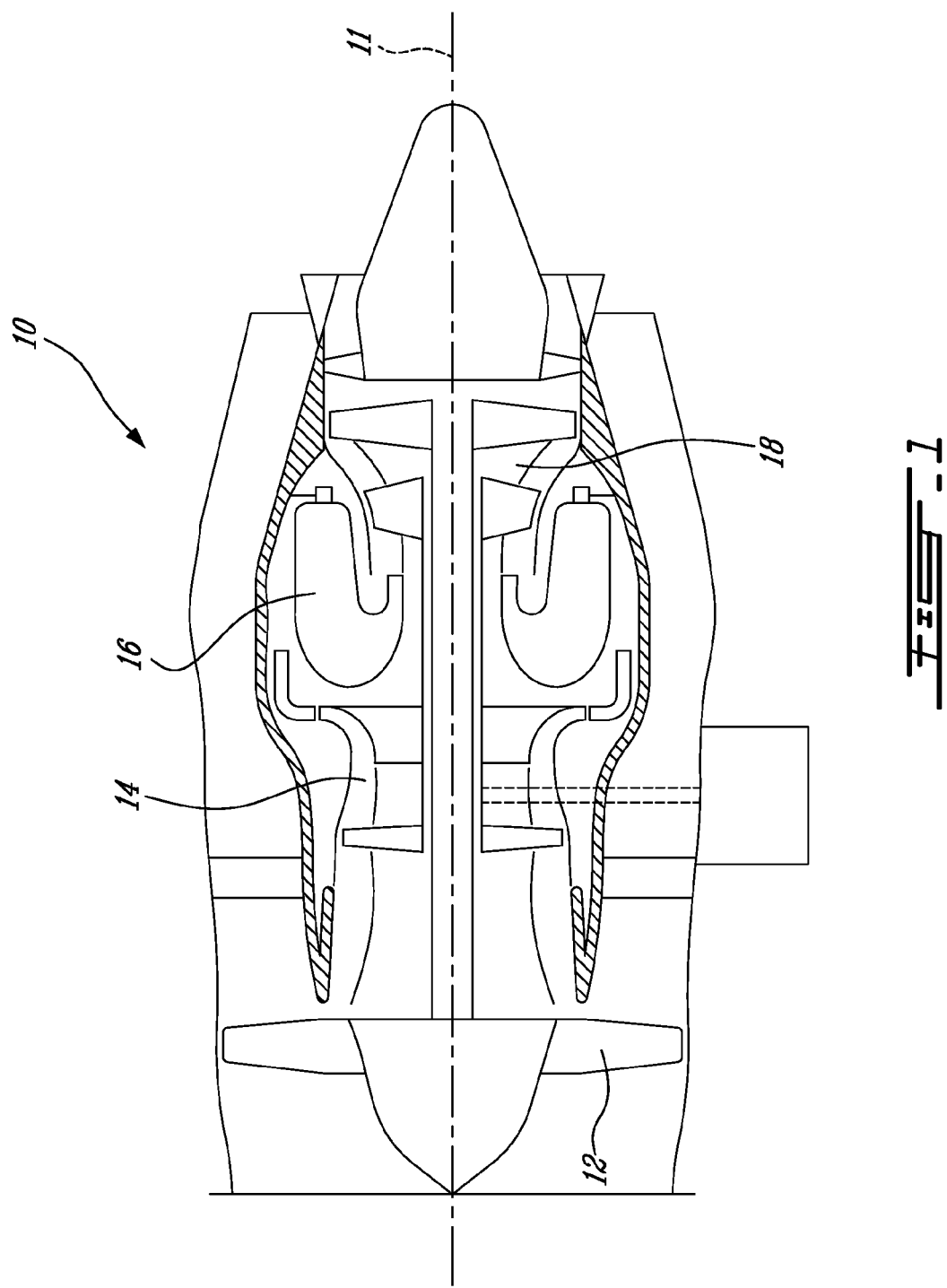
FIG. 1 is a schematic cross-sectional view of a turbofan gas turbine engine.

FIG. 1 illustrates a turbofan gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

Referring to FIG. 2, it can be seen that the compressor 14 comprises a shaft 22 on which the compressor rotor spool (not shown) is mounted. A bearing arrangement 20 rotatably supports the rotor shaft 22 with respect to a casing 24. The casing 24 is a structural part of the gas turbine engine 10, whereas the rotor shaft 22 rotates about its longitudinal axis while supporting the compressor rotor spool, including components such as compressor blades. The bearing 20 may be a ball bearing as illustrated in FIG. 2, with one of multiple balls illustrated at 25. Other types of bearings may be used as well, although ball bearings are well suited for axial damping configurations such as the one described hereinafter.

The bearing 20 has the inner race 26 mounted to the rotor shaft 22. The rotor shaft 22 may have a shoulder 28 to delimit the axial position of the inner race 26 on the rotor shaft 22. Appropriate connection means are provided on the opposite side of the inner race 26 to block axial movement of the inner race 26 on the rotor shaft 22.

An axial load damping system for the rotor shaft 22 is generally shown at 30. The axial load damping system 30 may comprise an outer race 32 for the bearing 20, and a support 34 connecting the outer race 32 to the casing 24. The outer race 32 may be integral with the support 34. The support 34 may be an annular wall extending radially outwardly from a front end of the outer race 32 and secured to the casing 24 at a connection portion of the support 34 by fasteners such as bolts 35, or in any other suitable way (e.g., welding, etc). The support 34 may have other shapes than an annular shape.

The annular support 34 has a wall portion 36 which is disposed in axially opposed facing relationship with a corresponding radially extending wall portion of the casing 24. As shown in FIG. 2, the wall portion 36 is disposed axially in front of the associated wall portion of the casing 24. A cavity or cavities 37 are defined between the support 34 and the wall of the casing 24. The cavity or cavities 37 contain a damping medium, such as oil. In FIG. 2, the cavities 37 are defined by concentrically disposed annular recesses defined in the rearwardly facing surface of the wall portion 36 of the annular support 34. Moreover, the damping medium may fill the radial clearance between the outer race 32 and the casing 24. Although not shown, a damping medium source may be in fluid communication with the cavities 37, to supply the cavities 37 with the damping medium. For instance, a pressurized oil source is mounted to the casing 24 and feeds the cavities 37 from the casing 24.

Seals 38 are positioned between the casing 24 and the outer race 32/annular support 34 to delimit the damping medium volume in which the damping medium accumulates, or to control the flow of the damping medium within the cavity 37. The seals 38 are typically annular rings, made of a material suited for the conditions associated with gas turbine engines. Due to the contact between the connection portion of the annular support 34 and the casing 24, seals may not be necessary therebetween to contain the damping fluid. However, seals such as a gasket may be used thereat.

In FIG. 2, an abutment 40 is defined between the cavities 37. The abutment 40 faces a frontal surface of the casing 24, and comes in contact therewith if the rearward axial motion of the annular support 34 is beyond a predetermined maximum.

Accordingly, the damping system 30 dampens axial motion of the outer race 32/annular support 34 with respect to the casing 24. The narrowing of the annular support 34 at the wall portion 36 results in elasticity thereat to absorb axial motion caused by axial forces on the rotor shaft 22. The damping medium in the cavities 37 absorbs the energy of the oscillations of the wall portion 36, thereby generally preventing or reducing the amplitude of the rotor shaft 22.

The abutment 40 is provided to limit the amplitude of oscillations of the outer race 32/annular support 34, by contacting the frontal surface of the casing 24. The cavity 37, or at least one cavity 37 if there are more than one, therefore separates the abutment 40 from the connection portion of the annular support 34, namely the portion where the annular support 34 is secured to the casing 24 (e.g., at the bolts 35). The thicknesses of the wall portion 36 and of the abutment 40 are selected as a function of the desired level of stiffness of the wall portion 36, and the maximum amplitude of oscillations of the wall portion 36. Accordingly, the stiffness of the wall portion 36 and the thickness of the abutment 40 may be adjusted to adapt the damping system 30 to specific conditions of a gas turbine engine, for instance to dampen shaft resonant natural modes and possibly forced vibration from larger engine system oscillations. By limiting the amplitude of oscillations of the wall portion 36, the damping system 30 absorbs axial loads at part thrust load, while supporting steady thrust loads. The abutment 40 may be an annular lug within the cavity 37 if the cavity 37 has an annular shape.

The surface of the wall portion 34 in which the cavity/cavities 37 is defined is preferably oriented such that the rotational axis of the rotor shaft 22 is generally normal thereto, although other arrangements may be used as well. The wall portion 34 is in a non-parallel relation with rotational axis of the rotor shaft 22.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

What is claimed is:

1. A damping system for a gas turbine engine comprising:
  at least one bearing mounted to a rotor shaft;
  a support connected to an outer race of the bearing, the support comprising a wall secured to a casing of the gas turbine engine at a connection portion, the wall having a first surface positioned against a surface of the casing with the first surface being in a non-parallel relation with the rotational axis of the rotor shaft, a cavity defined in the first surface by a narrowing of a thickness of the wall, the cavity containing a damping fluid to dampen elastic deformation of the wall at the cavity resulting from axial oscillations of the rotor shaft, and an abutment in the first surface adjacent to the cavity and separated from the connection portion of the wall by the cavity to limit an amplitude of the elastic deformation of the wall by abutment with the casing; and
  at least one seal between the support/bearing and the casing to contain the damping fluid in the cavity.

2. The damping system according to claim 1, wherein the rotational axis of the rotor shaft is generally normal to the first surface of the wall of the support.

3. The damping system according to claim 1, wherein the outer race of the bearing is an integral part of the support.

4. The damping system according to claim 1, wherein the at least one seal is between the outer race of the bearing and the casing.

5. The damping system according to claim 1, further comprising a seal in the cavity between the first surface of the wall and the casing to constrain movement of fluid in the cavity.

6. The damping system according to claim 1, wherein the abutment is positioned in the cavity.

7. The damping system according to claim 1, wherein the wall of the support has an annular shape in a radial orientation with respect to the rotor shaft.

8. The damping system according to claim 1, wherein the bearing is a ball bearing.

9. A gas turbine engine comprising:
  a casing;
  a compressor rotor spool including a rotor shaft;
  a damping system comprising at least one bearing mounted to the rotor shaft, a support connected to an outer race of the bearing, the support comprising a wall secured to the casing at a connection portion to support the bearing with respect to the casing for axial rotation of the rotor shaft, the wall having a first surface positioned against a surface of the casing with the first surface being in a non-parallel relation with the rotational axis of the rotor shaft, a cavity being defined in the first surface by a narrowing of a thickness of the wall, the cavity containing a damping fluid to dampen elastic deformation of the wall at the cavity resulting from axial oscillations of the rotor shaft, and an abutment adjacent to the cavity and separated from the connection portion of the wall by the cavity to limit an amplitude of the elastic deformation of the wall by abutment with the casing, and at least one seal between the support/bearing and the casing to contain the damping fluid in the cavity.

10. The gas turbine engine according to claim 9, wherein the rotational axis of the rotor shaft is generally normal to the first surface of the wall of the support.

11. The gas turbine engine according to claim 9, wherein the outer race of the bearing is an integral part of the support.

12. The gas turbine engine according to claim 9, wherein the at least one seal is between the outer race of the bearing and the casing.

13. The gas turbine engine according to claim 9, further comprising a seal in the cavity between the first surface of the wall and the casing to constrain movement of fluid in the cavity.

14. The gas turbine engine according to claim 9, wherein the abutment is positioned in the cavity.

15. The gas turbine engine according to claim 9, wherein the wall of the support has an annular shape in a radial orientation with respect to the rotor shaft.

16. The gas turbine engine according to claim 9, wherein the bearing is a ball bearing.

* * * * *